United States Patent
Yajima et al.

(10) Patent No.: US 8,765,244 B2
(45) Date of Patent: Jul. 1, 2014

(54) RESIN-MADE INLET PIPE AND METHOD OF PRODUCING THE PIPE

(71) Applicant: Tokai Rubber Industries, Ltd., Komaki (JP)

(72) Inventors: Takashi Yajima, Komaki (JP); Koji Mizutani, Komaki (JP); Kazutaka Katayama, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 0 days.

(21) Appl. No.: 13/665,645

(22) Filed: Oct. 31, 2012

(65) Prior Publication Data

US 2013/0056109 A1 Mar. 7, 2013

Related U.S. Application Data

(63) Continuation of application No. PCT/JP2012/054550, filed on Feb. 24, 2012.

(30) Foreign Application Priority Data

Feb. 25, 2011 (JP) .................................. 2011-039662

(51) Int. Cl.
*B29D 22/00* (2006.01)
*B29D 23/00* (2006.01)
*B32B 1/08* (2006.01)

(52) U.S. Cl.
USPC . 428/36.91; 428/36.9; 428/35.7; 264/171.26; 138/141

(58) Field of Classification Search
USPC ............ 138/141; 264/171.26; 428/35.7, 36.9, 428/36.91
See application file for complete search history.

(56) References Cited

FOREIGN PATENT DOCUMENTS

| JP | 9-133270 A | 5/1997 |
|---|---|---|
| JP | 11-048800 A | 2/1999 |
| JP | 11-105151 A | 4/1999 |
| JP | 2000-081170 A | 3/2000 |
| JP | 2001-108163 A | 4/2001 |
| JP | 2003-262290 A | 9/2003 |
| JP | 2005-149997 A | 6/2005 |
| JP | 2007-139043 A | 6/2007 |
| JP | 2009-511311 A | 3/2009 |
| WO | 20071057584 A1 | 5/2007 |

OTHER PUBLICATIONS

International Search Report for PCT/JP2012/054550, mailing date of May 22, 2012.
Notification of Transmittal of Translation of the International Preliminary Report on Patentabililty (Form PCT/IB/338) of International Application No. PCT/JP2012/54550 mailed Sep. 6, 2013 with Forms PCT/IB/373 and PCT/ISA/237. (8 pages).
Japanese Office Action dated Oct. 1, 2013 in corresponding Japanese Application No. 2012-534875 with English Translation. (5 pages).

*Primary Examiner* — Michael C Miggins
(74) *Attorney, Agent, or Firm* — Westerman, Hattori, Daniels & Adrian, LLP

(57) ABSTRACT

A resin-made fuel inlet pipe having a light weight excellent impact resistance, and causing no fuel leakage, includes: a tubular inner layer; and an outer layer laminated on an outer peripheral surface thereof, in which: the inner layer is formed of a resin having fuel resistance; the outer layer is formed of a resin (A) having a tensile elongation at 8 m/s measured by a high-speed tensile test of 200% or more; and the inner layer and the outer layer are in a substantially non-adherent state.

14 Claims, 1 Drawing Sheet

RESIN-MADE INLET PIPE AND METHOD OF PRODUCING THE PIPE

RELATED APPLICATION

This application is a continuation of International Application No. PCT/JP2011/054550, filed on Feb. 24, 2012, which claims priority to Japanese Patent Application No. 2011-039662, filed on Feb. 25, 2011, the entire contents of each of which are hereby incorporated by reference.

BACKGROUND OF THE INVENTION

1. Field of the Invention

The present invention relates to a resin-made fuel inlet pipe to be used in a fuel transport piping from a filler opening to a fuel tank in a vehicle such as an automobile and a method of producing the pipe, and more specifically, to a resin-made fuel inlet pipe formed by integrating a filler neck pipe, an inlet tube, and a filler hose, and a method of producing the pipe.

2. Description of the Related Art

A metal piping (inlet pipe) has been conventionally used on the fueling side of a fuel transport piping from a filler opening to a fuel tank in an automobile from the viewpoint of collision safety (impact resistance). A product obtained by connecting a resin- or rubber-made filler hose to the metal piping has been used by being attached to the fuel tank. In recent years, however, investigation has been conducted on a resin-made hose instead of the metal piping in association with a demand for a reduction in weight of the piping for an automobile.

For example, the following resin-made fuel filler tube for an automobile (Japanese Laid-open Patent Application No. 11-48800) has been proposed as a resin-made hose. The fuel filler tube is of a two-layer construction having two kinds of layers obtained by using a modified polyethylene resin in the outer layer of the main body of the tube, and any one of a polyamide-based resin, and ethylene vinyl alcohol and an elastomer thereof each having gas barrier property in the inner layer thereof.

However, the tube described in Japanese Laid-open Patent Application No. 11-48800 has the following drawback. Since the inner layer and the outer layer are integrally joined to each other by fusion, the occurrence of a crack in the inner layer at the time of collision causes a crack in the outer layer fused to the inner layer as well, with the result that fuel leaks to the outside. On the other hand, when an attempt is made to increase the thickness of the resin hose to provide the hose with impact resistance comparable to that of the metal piping, its volume also increases owing to the increased thickness of the hose, which is contrary to the demand for weight reduction.

SUMMARY OF THE INVENTION

The present invention has been made in view of such circumstances, and an objective of the present invention is to provide the following resin-made fuel inlet pipe and a method of producing the pipe. The pipe includes a resin layer having excellent fuel resistance as its inner layer, and a resin layer having ductility and excellent impact-absorbing property as its outer layer, the outer layer and the inner layer are in a substantially non-adherent state, and even when a crack occurs in the inner layer, the outer layer does not rupture, and hence the pipe has a light weight, excellent impact resistance, and causes no fuel leakage.

To achieve this objective, in a first aspect, the present invention provides a resin-made fuel inlet pipe, including: a tubular inner layer; and an outer layer laminated on an outer peripheral surface thereof, in which: the inner layer is formed of a resin having fuel resistance; the outer layer is formed of the following resin (A); and the inner layer and the outer layer are in a substantially non-adherent state: (A) a resin having a tensile elongation at 8 m/s measured by a high-speed tensile test of 200% or more.

In addition, in a second aspect, the present invention provides a method of producing the resin-made fuel inlet pipe, including subjecting the material for the inner layer and the material for the outer layer to co-extrusion to produce a resin-made fuel inlet pipe in which the outer layer is laminated on the outer peripheral surface of the inner layer in a substantially non-adherent state.

The inventors of the present invention have made extensive studies to obtain a resin-made fuel inlet pipe that has a light weight, excellent impact resistance, and causes no fuel leakage. During the process of the studies, the inventors have paid attention to the following. The fuel inlet pipe is provided with a structure having at least two layers, i.e., an inner layer and an outer layer, the inner layer is constituted of a resin material having excellent low-fuel permeability (fuel barrier property), the outer layer is constituted of a resin material having excellent impact resistance, and the functions of the inner layer and the outer layer are separated from each other. Then, as a result of repeated experiments on a material for the outer layer having an extremely large degree of elongation, the inventors have found that a desired object can be achieved by forming the outer layer with the following resin, and bringing the inner layer and the outer layer into a substantially non-adherent state. A resin having a tensile elongation at 8 m/s measured by a high-speed tensile test of 200% or more is used because the resin has ductility against high-speed impact at the time of collision. Thus, the inventors have reached the present invention. That is, according to the resin-made fuel inlet pipe of the present invention, even when a crack in a tensile direction occurs in the inner layer as a result of an impact such as a collision, the progress of the crack in the inner layer does not propagate through the outer layer. In addition, the outer layer has ductility. Accordingly, no crack occurs in the layer and hence fuel leakage can be prevented.

The phrase "the inner layer and the outer layer are in a substantially non-adherent state" as used in the present invention is not limited to a state where the inner layer and the outer layer do not adhere to each other at all, but is meant to include such an adherent state that the inner layer and the outer layer peel off each other upon impact such as a collision, e.g., such an adherent state that the inner layer and the outer layer adhere to each other at a certain point as well.

As described above, in the resin-made fuel inlet pipe of the present invention, the inner layer formed of the resin having fuel resistance and the outer layer are in a substantially non-adherent state. In addition, even when a crack in a tensile direction occurs in the inner layer owing to impact such as a collision, the progress of the crack in the inner layer does not propagate through the outer layer because the outer layer is formed of the resin having a tensile elongation at 8 m/s measured by the high-speed tensile test of 200% or more. According, no crack occurs in the outer layer and hence fuel leakage can be prevented. In addition, as the fuel leakage can be sufficiently prevented as described above, there is no need to increase the thickness of the pipe despite the fact that the pipe is a resin hose, and a significant weight reduction of the resin hose can be achieved. Further, the resin-made fuel inlet pipe of the present invention can be used as a neck-integrated fuel inlet pipe formed by integrating a filler neck pipe, an inlet tube, and a filler hose that have been conventionally separate bodies. Accordingly, the number of parts for a fuel transport piping reduces, and for example, assembling the hose in a vehicle becomes easier.

In addition, when the outer layer of the resin-made fuel inlet pipe of the present invention is formed by using a metallocene-based polyethylene (polyethylene polymerized with a metallocene catalyst) as the resin (A) and a high-density polyethylene (HDPE) in combination, the layer brings together both of their characteristics, i.e., ductility (elongation) derived from the metallocene-based polyethylene and rigidity (strength) derived from the HDPE. As a result, the extent to which the pipe maintains its tubular shape and the impact resistance of the tube additionally improve.

When the outer layer of the resin-made fuel inlet pipe of the present invention is formed by further using an ionic liquid, the conductivity of the pipe improves, and hence a spark due to charging at the time of fueling is prevented and the safety of the pipe additionally improves.

In addition, when the total thickness of the resin-made fuel inlet pipe is in the range of from 1.0 to 2.8 mm and the thickness of the outer layer is in the range of from 25 to 100% with respect to the thickness of the inner layer, the fuel inlet pipe is hardly pulled out of a connector. As a result, the main body of the fuel inlet pipe deforms with impact at the time of collision and hence can absorb the impact.

It should be noted that in the present invention, the total thickness of the resin-made fuel inlet pipe means, not the total thickness of a bellows portion, but the total thickness of a straight portion.

DETAILED DESCRIPTION OF THE PREFERRED EMBODIMENTS

Next, an embodiment of the present invention is described in detail, provided that the present invention is not limited to this embodiment.

Figure 1:
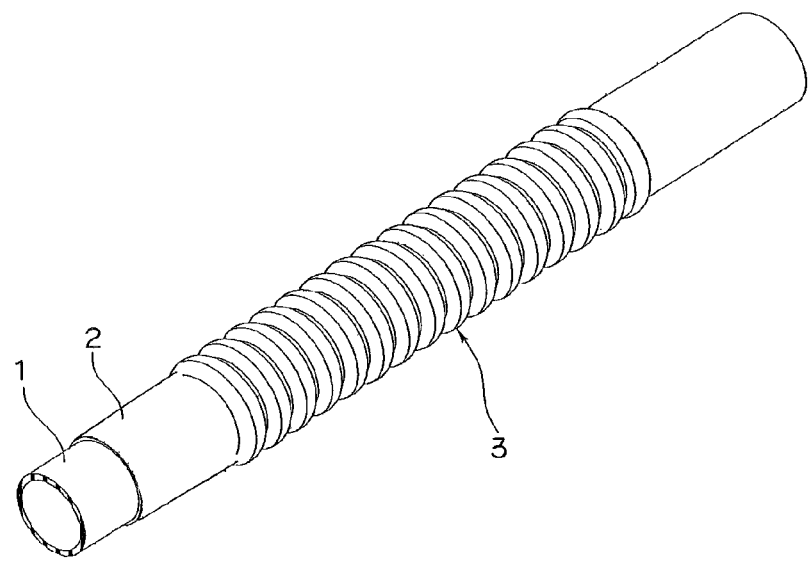
FIG. 1 is a view illustrating an example of construction of a resin-made fuel inlet pipe of the present invention.

For example, a resin-made fuel inlet pipe (hereinafter, sometimes referred to as "fuel inlet pipe") of the present invention is formed by laminating an outer layer 2 on the outer peripheral surface of a tubular inner layer 1 in a substantially non-adherent state, and its central portion is formed into a bellows portion 3 as illustrated in FIG. 1.

In the present invention, the inner layer 1 is formed of a resin having fuel resistance and the outer layer 2 is formed of the following resin (A):
(A) a resin having a tensile elongation at 8 m/s measured by a high-speed tensile test of 200% or more.

Next, a material for forming each layer is described.
<<Material for Inner Layer>>

The resin having fuel resistance is used as a material for the inner layer for forming the inner layer 1, and a polyamide resin or a polyethylene resin is preferred because each of these resins does not dissolve in fuel and has a strength such that the resin is not pulled out of a connecting portion.
<Polyamide Resin>

Examples of the polyamide resin include a polyamide 6 (PA6), a polyamide 46 (PA46), a polyamide 66 (PA66), a polyamide 92 (PA92), a polyamide 99 (PA99), a polyamide 610 (PA610), a polyamide 612 (PA612), a polyamide 1010 (PA1010), a polyamide 11 (PA11), a polyamide 912 (PA912), a polyamide 12 (PA12), a copolymer of a polyamide 6 and a polyamide 66 (PA6/66), a copolymer of a polyamide 6 and a polyamide 12 (PA6/12), and an aromatic nylon. One kind of these resins is used alone, or two or more kinds thereof are used in combination. Of these, the polyamide 11 and the polyamide 12 are preferred because of their excellence in low-fuel permeability and flexibility.
<Polyethylene Resin>

The polyethylene resin (PE) is not particularly limited as long as the resin is a crystalline thermoplastic resin obtained by polymerizing ethylene, and examples thereof include a high-density polyethylene (HDPE), a low-density polyethylene (LDPE), and a linear, low-density polyethylene (LLDPE). Of these, the HDPE is preferred in terms of fuel resistance.

One having a specific gravity in the range of 0.93 to 0.97, preferably 0.93 to 0.96, and a melting point in the range of 120 to 145° C. is useful as the HDPE. It should be noted that the specific gravity is a value based on ISO 1183 and the melting point is a value based on ISO 3146.
<<Material for Outer Layer>>

The resin (A) having a tensile elongation at 8 m/s measured by the high-speed tensile test of 200% or more is used as a material for forming the outer layer 2. When the tensile elongation at 8 m/s measured by the high-speed tensile test is excessively small, the impact resistance of pipe becomes poor and a crack occurs in the outer layer to cause fuel leakage.

Although an upper limit for the elongation of the specific resin (A) is preferably as large as possible, its measurement limit is 600% according to the measurement performance of a current high-speed tensile tester.

The tensile elongation at 8 m/s measured by the high-speed tensile test can be measured as described below. A resin plate having a thickness of 1 mm is produced with an injection molding machine (EC100SX manufactured by TOSHIBA MACHINE CO., LTD.), and then a JIS dumbbell No. 2 stamped out of the plate in an elongation direction is subjected to measurement with, for example, a high-speed tensile tester (IM100 manufactured by IMATEK).

Examples of the specific resin (A) include a polyethylene polymerized with a metallocene catalyst (metallocene-based polyethylene), a plastomer (polymer compound showing plasticity at around normal temperature like a synthetic resin), an olefin-based thermoplastic elastomer (TPO), a polyurethane-based thermoplastic elastomer (TPU), and a polyester-based thermoplastic elastomer (TPEE). One kind of these resins is used alone, or two or more kinds thereof are used in combination. Of these, a material in which a hard segment and a soft segment coexist is preferred.

The metallocene-based polyethylene is, for example, a metallocene-based LDPE.

The olefin-based thermoplastic elastomer (TPO) is, for example, a polypropylene (PP)-based, dynamically crosslinked TPO (crosslinking-type elastomer: TPV), or a PP-based reactor TPO (TPO as a result of multistage polymerization in a reactor).

The PP-based reactor TPO is specifically, for example, a copolymer of a crystalline polypropylene and an ethylene-α-olefin copolymer.

A preferred combination of the inner layer and the outer layer in the fuel inlet pipe of the present invention is as described below. When the inner layer is the polyamide resin, the outer layer is preferably the metallocene-based polyethylene, the olefin-based thermoplastic elastomer (TPO), or the polyester-based thermoplastic elastomer (TPEE). In addition, when the inner layer is the polyethylene resin, the outer layer is preferably the polyurethane-based thermoplastic elastomer (TPU). In addition, when the metallocene-based polyethylene is used in the outer layer, the HDPE or an ionic liquid may be used in combination in terms of impact resistance.

The weight mixing ratio "metallocene-based polyethylene/HDPE" between the metallocene-based polyethylene and the HDPE is preferably in the range of from 10/90 to 90/10, particularly preferably 70/30 to 90/10.

The ionic liquid is preferably a liquid including a cation of at least one of a six-membered ring or five-membered ring compound and an aliphatic compound, and an anion corresponding thereto, and examples thereof include 1-ethyl-3-methylimidazolium tetrafluoroborate, 1-hexyl-3-methylimidazolium trifluoromethanesulfonate, 1-hexylpyridium chloride, or N,N,N-trimethyl-N-propylammonium bis(trifluoromethanesulfonyl)imide. One kind of these liquids is used alone, or two or more kinds thereof are used in combination.

The content of the ionic liquid is preferably in a range from 0.1 to 5 parts by weight, particularly preferably from 0.1 to 1 part by weight with respect to 100 parts by weight of the total of the metallocene-based polyethylene and the HDPE.

The fuel inlet pipe of the present invention can be produced, for example, as described below. That is, the resin having fuel resistance as the material for the inner layer and the specific resin (A) as the material for the outer layer are subjected to co-extrusion to be molded into a tube shape. After that, a bellows structure is formed at the central portion of the resultant with a corrugator. Thus, a fuel inlet pipe can be produced in which the outer layer 2 is laminated on the outer peripheral surface of the inner layer 1 in a substantially non-adherent state, the central portion is formed into a bellows portion, and both end portions are each formed into a straight portion (see FIG. 1).

The respective dimensions of the fuel inlet pipe of the present invention are as described below.

The total thickness (straight portion) of the fuel inlet pipe of the present invention is preferably in the range of from 1.0 to 2.8 mm, particularly preferably 1.0 to 2.0 mm, most preferably 1.0 to 1.5 mm. The thickness of the inner layer 1 is preferably in the range of from 0.5 to 2.0 mm, particularly preferably 0.7 to 1.0 mm, and the thickness of the outer layer 2 is preferably in the range of from 0.1 to 1.0 mm, particularly preferably 0.3 to 0.5 mm.

In addition, the thickness of the outer layer 2 is preferably in the range of 25 to 100%, particularly preferably 28 to 50% with respect to the thickness of the inner layer 1. When the outer layer 2 is excessively thin, the following tendency is observed. A crack occurs in the outer layer 2, thereby resulting in poor impact resistance. When the outer layer 2 is excessively thick, the following tendency is observed. The property by which the fuel inlet pipe is pulled out of a connector deteriorates.

The total length of the fuel inlet pipe of the present invention is not particularly limited because the pipe is designed in accordance with the layout of an automobile. In addition, the total length of its bellows portion is set in consideration of the absorption of tolerance and workability at the time of assembly.

It should be noted that the structure of the resin-made fuel inlet pipe of the present invention is not limited to the two-layer structure formed of the inner layer 1 and the outer layer 2 as illustrated in FIG. 1, and for example, one or more innermost layers may be formed on the inner peripheral surface of the inner layer 1.

A material for forming the innermost layer is preferably a resin having permeation resistance against a fuel, and examples thereof include: fluorine resins such as a THV (thermoplastic fluorine resin formed of a terpolymer of vinylidene fluoride, hexafluoropropylene, and tetrafluoroethylene), an ETFE (ethylene-tetrafluoroethylene copolymer), and a polyvinylidene fluoride (PVDF); ethylene vinyl alcohol (EVOH); a polyphenylene sulfide (PPS); a polybutylene naphthalate (PBN); and a polybutylene terephthalate (PBT). It should be noted that the material for the innermost layer may be the same material (resin having fuel resistance) as the material for the inner layer.

The thickness of the innermost layer is typically in the range of from 0.05 to 0.5 mm, preferably 0.1 to 0.4 mm.

Figure 2:
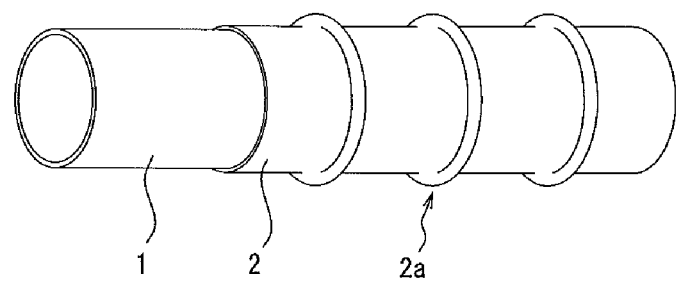
FIG. 2 is a view illustrating another example of construction of the resin-made fuel inlet pipe of the present invention.

It should be noted that the fuel inlet pipe of the present invention may have a plurality of (typically 2 to 50, 3 in FIG. 2) ring-like protrusions (structures like the so-called bamboo joints) 2a extending along the peripheral direction (direction perpendicular to the longitudinal direction of the fuel inlet pipe) of the outer layer 2 at a predetermined interval (typically an interval of from 5 to 50 mm) as illustrated in FIG. 2 in terms of an improvement in impact resistance. The ring-like protrusions 2a are preferably made of the same material as that for the outer layer 2 and can be formed integrally with the outer layer 2 by changing, for example, the speed of the corrugator or the amount of the material to be ejected from an extruder.

EXAMPLES

Next, examples are described together with comparative examples, provided that the present invention is not limited to these examples.

First, the following materials were prepared prior to the examples and the comparative examples.

It should be noted that the simple term "elongation" to be described hereinafter means a tensile elongation at 8 m/s measured with a high-speed tensile tester (IM100 manufactured by IMATEK) as described in the foregoing.

<<Material for Inner Layer>>
<PA11>
RILSAN BESN BK P20TL manufactured by Arkema (elongation: 50%)
<HDPE>
NOVATEC PE HY540 manufactured by Japan Polyethylene Corporation (elongation: 20%)
<<Material for Outer Layer>>
<Metallocene-Based LDPE (i)>
KERNEL KF261T manufactured by Japan Polyethylene Corporation (elongation: 460%)
<Metallocene-Based LDPE (ii)>
KERNEL KS560 manufactured by Japan Polyethylene Corporation (elongation: 330%)
<HDPE>
NOVATEC PE HY540 manufactured by Japan Polyethylene Corporation (elongation: 20%)
<Ionic Liquid>
N,N,N-trimethyl-N-propylammonium bis(trifluoromethanesulfonyl) imide manufactured by KANTO CHEMICAL CO., INC.
<PP-Based Reactor TPO: PP Copolymer (i)>
PRIME TPO M142E manufactured by Prime Polymer Co., Ltd. (elongation: 260%)
<PP-Based Reactor TPO: PP Copolymer (ii) (for Comparative Examples)>
PRIME TPO J-5900 manufactured by Prime Polymer Co., Ltd. (elongation: 80%)
<TPEE>
HYTREL 4767 manufactured by DU PONT-TORAY CO., LTD. (elongation: 340%)

<TPU>
MIRACTRAN E980 manufactured by Nippon Miractran Co., Ltd. (elongation: 600%)
<PP-Based, Dynamically Crosslinked TPO (TPV)>
THERMORUN 3555N manufactured by Mitsubishi Chemical Corporation (elongation: 600%)

Example 1

The PA11 (RILSAN BESN BK P20TL (elongation: 50%) manufactured by Arkema) as a material for an inner layer and the metallocene-based LLDPE (i) (KERNEL KF261T (elongation: 460%) manufactured by Japan Polyethylene Corporation) as a material for an outer layer were subjected to co-extrusion to be molded into a tube shape. After that, a bellows structure was formed at the central portion of the resultant with a corrugator (manufactured by Colmar). Thus, a fuel inlet pipe was produced in which the central portion was formed into a bellows portion and both end portions were each formed into a straight portion.

The fuel inlet pipe had the following dimensions. The inner diameter of the straight portion was 32 mm, the outer diameter of the straight portion was 34.8 mm, the thickness of the inner layer was 1.0 mm, the thickness of the outer layer was 0.4 mm, the outer diameter of the bellows portion was 38 mm, the total length was 150 mm, and the length of the bellows portion was 50 mm. It should be noted that the inner diameter and the outer diameters were measured with a vernier caliper, and the thickness of each layer was measured by observing sections of the bellows portion and the straight portion with a microscope (VH-8000 manufactured by KEYENCE CORPORATION).

Examples 2 to 10 and Comparative Examples 1 to 3

Fuel inlet pipes were each produced in conformity with Example 1 except that the material for the outer layer was changed to any one of the combinations shown in Table 1 and Table 2 below, and the thickness of the outer layer or the inner layer was changed to a predetermined thickness.

TABLE 2

| | | Comparative Example | | |
|---|---|---|---|---|
| | | 1 | 2 | 3 |
| Inner layer | Material | PA11 | HDPE | PA11 |
| | Thickness (mm) | 1.4 | 1.4 | 1.0 |
| Outer layer | Material | — | — | PP copolymer (ii) |
| | Thickness (mm) | — | — | 0.4 |
| Interlayer adhesiveness | | — | — | No adhesion |
| Impact resistance | | x | x | x |

The fuel inlet pipes of the examples and the comparative examples thus obtained were evaluated for respective characteristics in accordance with the following criteria. Table 1 and Table 2 above show these results together.

<Interlayer Adhesiveness>
The inner layer and outer layer of each fuel inlet pipe were evaluated for their adherent state by forcedly peeling the layers with a hand. In the present invention, the inner layer and the outer layer are preferably free of adhering to each other.

<Impact Resistance>
The state of a crack in each of the inner layer and outer layer of each fuel inlet pipe was examined by setting the pipe in a high-speed tensile tester (IM100 manufactured by IMATEK) and subjecting the pipe to a high-speed tensile test at 40 km/h. A fuel inlet pipe in which a crack occurred only in the inner layer and no crack occurred in the outer layer was evaluated as ○, and a fuel inlet pipe in which cracks occurred in both the inner layer and the outer layer was evaluated as x. It should be noted that in the case of a single-layer fuel inlet pipe, the pipe was evaluated as x when a crack occurred in its single layer.

As can be seen from the results of the tables, each of the products of the examples has excellent impact resistance because the outer layer is formed of a resin having an extremely high tensile elongation and hence no crack occurs in the outer layer. Accordingly, it is assumed that no fuel leakage occurs even at the time of a collision.

It should be noted that each of the products of Examples 8 and 9 had particularly excellent impact resistance because the outer layer was formed of the metallocene-based polyethyl-

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Inner layer | Material | PA11 | PA11 | PA11 | PA11 | PA11 | PA11 | HDPE | PA11 | PA11 | PA11 |
| | Thickness (mm) | 1.0 | 1.0 | 1.0 | 1.0 | 0.7 | 0.7 | 1.0 | 1.0 | 1.0 | 1.0 |
| Outer layer | Material | Metallocene-based LDPE (i) (100 parts) | Metallocene-based LDPE (ii) (100 parts) | PP copolymer (i) (100 parts) | TPEE (100 parts) | TPV (100 parts) | TPV (100 parts) | Metallocene-based LDPE (i) (100 parts) | Metallocene-based LDPE (i) (10 parts) | Metallocene-based LDPE (i) (90 parts) | Metallocene-based LDPE (i) (10 parts) |
| | | — | — | — | — | — | — | — | HDPE (90 parts) | HDPE (10 parts) | HDPE (90 parts) |
| | | — | — | — | — | — | — | — | — | — | Ionic liquid (1 part) |
| | Thickness (mm) | 0.4 | 0.4 | 0.4 | 0.4 | 0.7 | 0.7 | 0.4 | 0.4 | 0.4 | 0.4 |
| Interlayer adhesiveness | | No adhesion | No adhesion | No adhesion | No adhesion | No adhesion | No adhesion | No adhesion | No adhesion | No adhesion | No adhesion |
| Impact resistance | | ○ | ○ | ○ | ○ | ○ | ○ | ○ | ○ | ○ | ○ | ene and the high-density polyethylene (HDPE). In addition, the product of Example 10 had excellent conductivity because the outer layer further contained the ionic liquid.

In contrast, the product of Comparative Example 1 has insufficient high-speed tensile elongation and hence poor impact resistance because the product is of a single-layer structure formed only of the PA11 having an elongation of 50%. Accordingly, it is assumed that fuel leakage occurs at the time of a collision.

The product of Comparative Example 2 has insufficient high-speed tensile elongation and hence poor impact resistance because the product is of a single-layer structure formed only of the HDPE having an elongation of 80%. Accordingly, it is assumed that fuel leakage occurs at the time of a collision.

Although the outer layer is formed on the outer peripheral surface of the inner layer in Comparative Example 3, the PP copolymer (ii) having an elongation of 80% is used in the outer layer, and hence the outer layer has insufficient high-speed tensile elongation and hence the product of the comparative example has poor impact resistance. Accordingly, it is assumed that fuel leakage occurs at the time of a collision.

It should be noted that the above-mentioned examples, which have shown specific embodiments in the present invention, are merely examples and should not be construed as being limitative. In addition, all modifications belonging to the scope equivalent to the scope of claims fall within the scope of the present invention.

The fuel inlet pipe of the present invention, which can be used in a fuel transport piping from a filler opening to a fuel tank in a vehicle such as an automobile, e.g., a filler neck pipe, an inlet tube, a filler hose, or a breather tube, is preferably used in a neck-integrated fuel inlet pipe formed by integrating the filler neck pipe, the inlet tube, and the filler hose.

What is claimed is:

1. A resin-made fuel inlet pipe, comprising:
   a tubular inner layer; and
   an outer layer laminated on an outer peripheral surface thereof,
   wherein:
   the inner layer is formed of a resin having fuel resistance;
   the outer layer is formed of a resin (A), which comprises a metallocene-based polyethylene comprising a high-density polyethylene (HDPE) and an ionic liquid and which has a tensile elongation at 8 m/s measured by a high-speed tensile test of 200% or more; and
   the inner layer and the outer layer are in a substantially non-adherent state.

2. A resin-made fuel inlet pipe according to claim 1, wherein the metallocene-based polyethylene comprises a metallocene-based, linear, low-density polyethylene (LLDPE).

3. A resin-made fuel inlet pipe according to claim 1, wherein a weight mixing ratio of the metallocene-based polyethylene relative to the HDPE is in a range of from 10/90 to 90/10.

4. A resin-made fuel inlet pipe according to claim 1, wherein the ionic liquid comprises at least one selected from the group consisting of 1-ethyl-3-methylimidazolium tetrafluoroborate, 1-hexyl-3-methylimidazolium trifluoromethanesulfonate, 1-hexylpyridium chloride, and N,N,N-trimethyl-N-propylammonium bis(trifluoromethanesulfonyl)imide.

5. A resin-made fuel inlet pipe according to claim 1, wherein a content of the ionic liquid is 0.1 to 5 parts by weight with respect to 100 parts by weight of a total of the metallocene-based polyethylene and the HDPE.

6. A resin-made fuel inlet pipe according to claim 1, wherein a total thickness of a pipe wall is in a range of from 1.0 to 2.8 mm and a thickness of the outer layer is in a range of from 25 to 100% with respect to a thickness of the inner layer.

7. A resin-made fuel inlet pipe according to claim 1, wherein a central portion of the pipe has a bellows structure and end portions of the pipe each have a straight structure.

8. A resin-made fuel inlet pipe according to claim 1, wherein the inner layer comprises one of a polyamide 11 and a polyamide 12.

9. A resin-made fuel inlet pipe according to claim 1, wherein the inner layer comprises a high-density polyethylene (HDPE).

10. A resin-made fuel inlet pipe according to claim 1, wherein the inner layer comprises a polyamide resin, and the resin (A) for forming the outer layer comprises one of a metallocene-based polyethylene, an olefin-based thermoplastic elastomer (TPO), and a polyester-based thermoplastic elastomer (TPEE).

11. A resin-made fuel inlet pipe according to claim 1, wherein the inner layer comprises a polyethylene resin and the resin (A) forming the outer layer comprises a polyurethane-based thermoplastic elastomer (TPU).

12. A method of producing the resin-made fuel inlet pipe according to claim 1, comprising subjecting a material for an inner layer and a material for an outer layer to co-extrusion to produce a resin-made fuel inlet pipe in which the outer layer is laminated on the outer peripheral surface of the inner layer in a substantially non-adherent state,
   wherein:
   the inner layer is tubular;
   the material for the inner layer comprises a resin having fuel resistance;
   the material for the outer layer comprises a resin (A), which is a metallocene-based polyethylene comprising a high-density polyethylene (HDPE) and an ionic liquid and which has a tensile elongation at 8 m/s measured by a high-speed tensile test of 200% or more.

13. A resin-made fuel inlet pipe according to claim 1, further comprising one or more innermost layers on an inner peripheral surface of the inner layer.

14. A resin-made fuel inlet pipe according to claim 13, wherein a material for forming the innermost layer comprises at least one selected from the group consisting of a thermoplastic fluorine resin (THV) formed of a terpolymer of vinylidene fluoride, hexafluoropropylene, and tetrafluoroethylene, an ethylene-tetrafluoroethylene copolymer (ETFE), a polyvinylidene fluoride (PVDF), ethylene vinyl alcohol (EVOH), a polyphenylene sulfide (PPS), a polybutylene naphthalate (PBN), and a polybutylene terephthalate (PBT).

* * * * *

UNITED STATES PATENT AND TRADEMARK OFFICE
CERTIFICATE OF CORRECTION

| | |
|---|---|
| PATENT NO. | : 8,765,244 B2 |
| APPLICATION NO. | : 13/665645 |
| DATED | : July 1, 2014 |
| INVENTOR(S) | : Takashi Yajima et al. |

Page 1 of 1

It is certified that error appears in the above-identified patent and that said Letters Patent is hereby corrected as shown below:

On Title page item (54) and in the Specification, Column 1, Lines 1-2:

Change

"RESIN-MADE INLET PIPE AND METHOD OF PRODUCING THE PIPE"

to

RESIN-MADE --FUEL-- INLET PIPE AND METHOD OF PRODUCING THE PIPE

Signed and Sealed this
Fourteenth Day of October, 2014

Michelle K. Lee
*Deputy Director of the United States Patent and Trademark Office*